United States Patent [19]
Huotari et al.

[11] Patent Number: 6,044,264
[45] Date of Patent: Mar. 28, 2000

[54] METHOD FOR ACTIVATING INTELLIGENT NETWORK SERVICES IN A MOBILE COMMUNICATION SYSTEM, AND A MOBILE COMMUNICATION SYSTEM

[75] Inventors: Seppo Huotari, Espoo; Veli Turkulainen, Helsinki, both of Finland

[73] Assignee: Nokia Telecommunications Oy, Espoo, Finland

[21] Appl. No.: 08/836,544

[22] PCT Filed: Oct. 31, 1995

[86] PCT No.: PCT/FI95/00601

§ 371 Date: Aug. 22, 1997

§ 102(e) Date: Aug. 22, 1997

[87] PCT Pub. No.: WO96/13949

PCT Pub. Date: May 9, 1996

[30] Foreign Application Priority Data

Nov. 1, 1994 [FI] Finland ..................................... 945151

[51] Int. Cl.[7] .............................. H04M 3/42; H04M 3/00; H04Q 7/20
[52] U.S. Cl. .......................... 455/414; 455/445; 455/433; 455/418
[58] Field of Search ..................................... 455/414, 445, 455/517, 433, 422, 435, 418; 379/207, 201, 219, 220, 229, 230

[56] References Cited

FOREIGN PATENT DOCUMENTS

| | | |
|---|---|---|
| 93/03585 | 2/1993 | WIPO . |
| 93/18606 | 9/1993 | WIPO . |
| 95/26114 | 9/1995 | WIPO . |

*Primary Examiner*—Dwayne D. Bost
*Assistant Examiner*—Tracy M. Legree
*Attorney, Agent, or Firm*—IP Group of Pillsbury Madison & Sutro LLP

[57] ABSTRACT

The invention relates to a mobile communication network and a method for activating intelligent network services in the mobile communication network. In the invention, the mobile services switching center (MSC) operates as the service switching point of the intelligent network. The mobile services switching center stores the service triggers, which service triggers comprise the triggering criteria for the services and the information required for visiting the service control point (SCP). The mobile subscriber's subscriber data in the subscriber database (HLR) is provided with an intelligent network service trigger key which points to one or more service triggers. As the mobile services switching center obtains the trigger key of the mobile subscriber during the call setup, it activates the service triggers indicated by the key. As the triggering criteria of the service trigger are met at some phase of the call, the mobile services switching center triggers the respective intelligent network service in the service control point (SCP) indicated by the service trigger.

16 Claims, 3 Drawing Sheets

METHOD FOR ACTIVATING INTELLIGENT NETWORK SERVICES IN A MOBILE COMMUNICATION SYSTEM, AND A MOBILE COMMUNICATION SYSTEM

This application is the national phase of international application PCT/FI95/00601 filed Oct. 31, 1995 which designated the U.S.

FIELD OF THE INVENTION

The present invention relates to a mobile communication system comprising at least one mobile switching center, mobile subscribers, at least one subscriber database and an intelligent network comprising at least one service switching point, and at least one service control point comprising the database and service logic programs of the intelligent network, whereby the intelligent network contains predefined service triggers, each trigger defining triggering criteria for activating a respective intelligent network service in one of the service control points, and more particularly to activating of the intelligent network service in a mobile communication system.

BACKGROUND OF THE INVENTION

In communication networks, intelligence relates to the ability to have access to stored data, to process it and to make decisions on the basis of the data. Even the present communication networks, such as public switched telephone networks (PSTN), are to some extent intelligent, because they are able to process stored data in relation with, for example, routing of calls. A typical "intelligent" facility in modern communication networks is a conditional call forwarding which requires an analysis of the call situation and routing the call forward on the basis of the stored service profile of the call forwarding. Such intelligent facilities have, however, been an integral part of the basic network, and have thus required, for example, software updating in all the network exchanges in cases of altering or increasing the number of facilities.

An Intelligent Network (IN) is a network architecture which can be incorporated in the basic network, and which makes implementation and controlling of services faster, easier and more flexible. This can be achieved by moving the service control out from the switching exchange into a separate functional unit of the intelligent network. This is how the services can be made independent of the operation of the basic network, and changes in the structure of the basic network or in the software are not required in conjunction with altering or increasing the number of services. In addition to the actual network operator, the intelligent network may contain several service providers.

In fixed networks, standardization of intelligent networks has been rapid in recent years. Standards of intelligent networks include the CCITT Q.1290 and prETS 300 374-1, Intelligent Network Capability Set 1 (CS1). These standards define a specific functional and hierarchical model for the intelligent network. In this model, service control is transferred from the exchange of the basic network to a service control point (SCP) in the intelligent network. The SCP comprises a database and service logic programs (SLP), i.e. computer programs which fulfil the logic structure of a specific programs (service logic). The intelligent network services are created, tested and withdrawn by means of special equipment referred to as service creation environment (SCE). Service management function (SMF) is used for management of subscriber and network information in the database, including service specific information and service programs. The service switching point (SSP) is an exchange, for example that of the basic network, fulfilling the service switching function (SSF), in other words, the recognition of the intelligent network service and activation of interaction with the service control point SCP.

For recognition and activation of an intelligent network service, the intelligent network contains predefined triggers for the service, the triggers defining triggering criteria used for activation of the intelligent network service. The triggering criteria comprise, for example, the phase of the call routing, detection point (DP) according to the ETSI CS1 call model, which detection point is an event relating to call processing. If the triggering criteria defined by the trigger are fulfilled, the intelligent network service is activated in a SCP defined by the trigger.

As stated above, the intelligent network standards have been developed for fixed communication networks. There is no similar standardization for mobile communication networks. It is difficult to implement intelligent network functionality of the ETSI CS1 type, for example, in a mobile communication network in which mobile subscribers have no fixed access point in the network. However, in every part of the mobile communication network it should be possible to recognize mobile subscribers using intelligent network services, have information on the services and triggers of each mobile subscriber, etc. This easily leads to massive data files and/or large data transmission requirements within the mobile communication network.

SUMMARY OF THE INVENTION

It is an object of the present invention to implement intelligent network functionality in a simple way in a mobile communication network.

It is a further object of the present invention to activate an intelligent network service in a mobile communication network by loading the network as little as possible.

This is achieved by a mobile communication system comprising at least one mobile switching center, mobile subscribers, at least one subscriber database and an intelligent network comprising at least one service switching point, and at least one service control point comprising the database and service logic programs of the intelligent network, whereby the intelligent network contains predefined service triggers, each trigger defining triggering criteria for activating a respective intelligent network service in one of the service control points. The mobile communication system of the invention is characterized in that the mobile services switching center operates as the service switching point of the intelligent network, and the service control point is implemented as a functional unit independent of the mobile services switching center, and communicates with the mobile services switching center by means of the intelligent network interface and the intelligent network protocol, the subscriber data of a mobile subscriber entitled to intelligent network services in said at least one subscriber database includes a service trigger key pointing to one or more service triggers, the mobile services switching center is arranged to react to the service trigger key of the mobile subscriber during call setup by retrieving one or more triggers pointed to by the trigger key, and by triggering an intelligent network service corresponding to said retrieved trigger in one of the service control points as the triggering criteria of the trigger are met.

The invention also relates to a method for activating an intelligent network service in a mobile communication network comprising at least one mobile switching center, mobile subscribers, at least one subscriber database and an intelligent network comprising at least one service switching point, and at least one service control point comprising a database and service logic programs of the intelligent network, the method comprising maintaining in the intelligent network predefined service triggers, each trigger defining triggering criteria for activating a respective intelligent network service in one of the service control points, characterized by providing the. mobile subscriber entitled to intelligent network services with a trigger key which points to one or more service triggers, maintaining the triggers in the mobile services switching center so that they can be activated by the trigger keys, activating in the mobile services switching center, in conjunction with an intelligent network call, those of the triggers pointed to by the trigger key of the mobile subscriber, triggering the intelligent network service corresponding to the trigger in one of the service control points as the triggering criteria of the trigger are met in the mobile services switching center.

The invention utilizes the mobile services switching center as the switching point for an intelligent network service, providing access for the user of a mobile communication network to intelligent network services in a way independent of the service. The mobile services switching center communicates with the service control point by means of the standard interface of the intelligent network and the communication protocol. The mobile services switching center is able to recognize a call requiring an intelligent network service and to activate the intelligent network service in the service control point without any need for it to know the specific service. The mobile services switching center masters a set of basic functions of the intelligent network, which are executed according to instructions from the service control point.

The mobile services switching center stores the triggers for the service, which triggers comprise the triggering criteria for the services and the information required for a visit to the service control point. The mobile subscriber's subscriber data is assigned with a trigger key for the intelligent network service, said trigger key pointing to one or more triggers for the service. As the mobile services switching center obtains the trigger key of the mobile subscriber during the call setup, it activates the triggers indicated by the key. As the trigger condition of the trigger at some phase of the call is fulfilled, the mobile services switching center triggers the intelligent network service indicated by the trigger in the service control point indicated by the trigger.

By the present invention, the signalling load caused by the intelligent network function does not increase, because in the mobile communication network it is only necessary to transfer the subscriber's trigger key which may, for example, be a numerical value. This new parameter can easily be included in the subscriber data nowadays transmitted in mobile communication networks. Each value of the trigger key points to one service package, i.e. to the trigger of the intelligent network service, or a combination of triggers, there being a relatively small and restricted number of them in use. The value of the trigger key thus depends on the desired service package, and may be the same for several subscribers. As a result, the mobile services switching center only needs to store, instead of subscriber specific service data, a relatively small and restricted number of triggers among which the triggers of the mobile subscriber are selected by means of the trigger key. As only the triggering criteria, address of the service control point and the service key used for the recognition of the service associate the trigger with the actual intelligent network service, the operation of the mobile services switching center in recognition and activation of the intelligent network service is essentially independent of the service. The service provider may modify the service without changes in the triggers which are stored in the mobile services switching centers. A new service package can be added by allocating for it a free trigger key value which points to a desired trigger key or keys, and by notifying the mobile services switching center of the allocation as well as the possible new triggers.

BRIEF DESCRIPTION OF THE DRAWINGS

In the following, the invention will be described in greater detail with reference to the accompanying drawings in which.

THE PREFERRED EMBODIMENTS OF THE INVENTION

In principle, the present invention can be applied to any mobile communication system, such as the Pan-European mobile communication system GSM (Global System for Mobile Communications), NMT (Nordic Mobile Telephone), DCS1800 (Digital Communication System), PCN (Personal Communication Network), UMC (Universal Mobile Communication), UMTS (Universal Mobile Telecommunication System), FPLMTS (Future Public Land Mobile Telecommunication System), etc.

Figure 1:
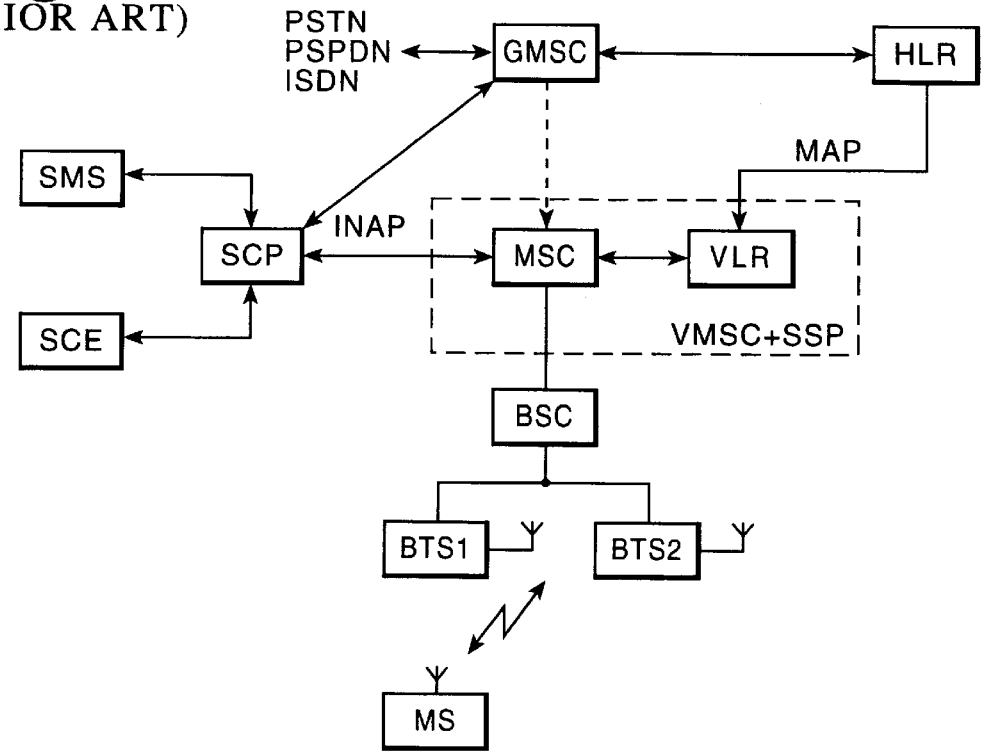
FIG. 1 shows a simplified diagram of a mobile communication system according to the invention.

The GSM system is here used as an example to describe the preferred embodiments of the invention without, however, restricting the invention to it. FIG. 1 very briefly illustrates the basic elements of the GSM system without going any further into the characteristics of the elements or other subareas of the system. For a closer description of the GSM system, the GSM recommendations and "The GSM System for Mobile Communications", M. Mouly & M. Pautet, Palaiseau, France, 1992, ISBN:2-9507190-0-7 are referred to.

A mobile services switching center MSC handles the switching of incoming and outgoing calls. It carries out functions similar to those of an exchange of a public switched telephone network (PSTN). In addition to these, it also carries out functions characteristic of mobile communications only, such as subscriber location management in co-operation with the subscriber registers of the network. The calls between the mobile communication network and other communication networks, such as PSTN, PSPDN and ISDN, are routed through a gateway mobile services switching center GMSC. The mobile stations MS are connected to the center MSC by base station systems. The base station system consists of a base station controller BSC and base stations BTS.

As subscriber registers, the GSM system includes the home location register HLR and the visitor location register VLR. The subscriber data of the mobile subscriber are permanently maintained in the home location register HLR. The subscriber data are temporarily copied to that visitor location register VLR which the mobile subscriber is visiting. There is typically one VLR for each mobile services switching center MSC. The VLR and the MSC may be realized as one unit referred to by the abbreviation VMSC.

Figure 2:
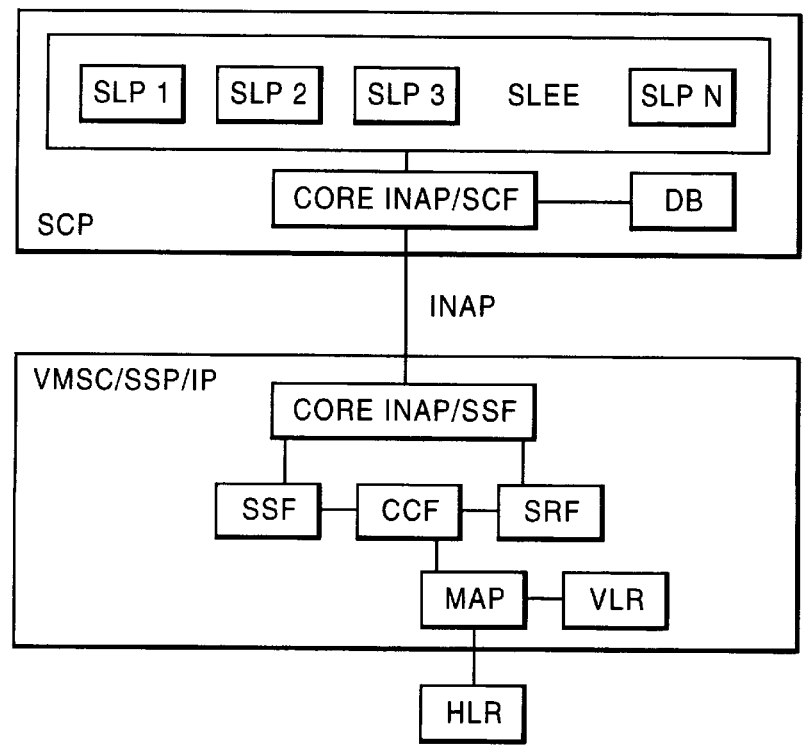
FIG. 2 shows a block diagram illustrating CS-1 IN architecture in a mobile communication system according to the invention.

According to the invention, intelligent network functionality is so incorporated in the mobile communication system that the mobile services switching center VMSC functions as the service switching point SSP, and the service control point SCP comprising the service logic and data is outside the exchange as a separate functional unit. In accordance with FIG. 2, the SCP comprises a database DB and service logic programs SLP, i.e., computer programs fulfilling the logic structure (service logic) of a specific service. In FIG. 2, the SCP comprises n number of service logic programs SLP. In addition, the SCP comprises a service control function SCF and a Core INAP protocol software for communication with the mobile services switching centers VMSC and GMSC. Other functional units of the intelligent network are connected to the SCP. The intelligent network services are created, tested and withdrawn by means of special equipment referred to as service creation environment SCE. A service management system SMS is used for controlling information concerning the users and the network in the database, including service specific information and service programmes.

The mobile services switching center VMSC functions as the service switching point SSP fulfilling the service switching function SSF, providing the user with access to intelligent network services in a way independent of the service. The VMSC/SSP is able to recognize a call requesting intelligent network service, which call may originate in a mobile subscriber MS located in the VMSC area, in a public switched telephone network (PSTN), or in a private branch exchange (PBX). The intelligent network call may, as a result of the intelligent network service, be routed towards a mobile subscriber, a public switched telephone network (PSTN), or a private branch exchange (PBX). For reasons of clarity, FIG. 2 only shows in the mobile services switching center VMSC the functional blocks necessary for describing the invention. It is, however, obvious for a person skilled in the art that the VMSC comprises a lot of other units which are not, however, shown here. A suitable commercial mobile services switching center to which the present invention can be applied is the DX200 MSC manufactured by Nokia Telecommunications.

In accordance with FIG. 2, the VMSC/SSP comprises a call control function CCF, a service switching function SSF, a special resource function SRF, a visitor location register VLR and a MAP protocol software. The CCF takes care of normal call control of the mobile communication network, recognizes intelligent network calls, and informs the SSF of predetermined call phases. The CCF and the SFF communicate by using an internal interface. The special resource function SRF takes care of user interactive functions, such as announcements and reception of DTMF (Dual Tone Multi Frequency) codes. The SSF stores triggers for a service, and upon fulfilment of triggering criteria activates a desired intelligent network service in the SCP, as will be explained below. The VMSC/SSP also comprises the Core INAP protocol software which the SSF uses for communication with the SCP by means of the standard interface and standard protocol of the intelligent network. The INAP protocol is described in the document prETS300 374-1,1 Intelligent Network (IN); Intelligent Network Capability Set 1 (CS1), Core Intelligent Network Application Protocol (INAP), Part 1, Protocol Specification. The MAP (Mobile Application Part) protocol takes care of communication between the call control function CCF, the visitor location register VLR and the home location register HLR.

For reasons of clarity, FIGS. 1 and 2 only show one VMSC/SSP and SCP, but it should be understood that there may be any desired number of said units in the mobile communication network. For example, each provider of an intelligent network service may have a SCP of its own. The Core INAP protocol forms an open interface which can be used for connecting numerous units with each other. Also the gateway mobile services switching center GMSC may be of the VMSC/SSP type described above, forming, in addition, a gateway to other communication networks.

Typically, intelligent network services offer some supplementary features to be paid for by the subscriber. Thus, it is obvious that handling of an intelligent network service is not involved in every call. The intelligent network call handling capacity depends on the CCF capacity in the SSP and on the SCP capacity which can be increased by adding SCPs. Typical IN services that the present invention could support include, for example, virtual private network VPN, number translation services, personal number PN, freephone service FPH, premium rate service PRM, originating call screening OCS, terminating call screening TSC, etc.

For recognition and activation of an intelligent network service, the intelligent network contains predefined triggers for the service, the triggers defining the triggering criteria used for activation of the intelligent network service. According to the invention, the trigger file comprising the trigger record is stored in the mobile services switching center VMSC in the SSF block. One record comprises definitions that are required in order to activate a specific IN service in a specific SCP. The trigger record may comprise, for example, the following fields:

Service Key. The identification of the service which is sent to SCP in Core INAP operations (for example, Initial DP).

Trigger status. ON/OFF. The trigger may temporarily be disabled without deleting the trigger record.

Detection Point (DP). It defines the detection point DP in the basic call state model BCSM where the service will be triggered.

SCP address source. It indicates where the call control point finds the SCP address. Possibilities: in trigger record/A-number/B-number.

SCP address. This is used if the SCP address source="in trigger record".

Trigger priority. The trigger is given one of 16 priority classes. If there are several triggers active in the same detection point DP, they are triggered (detected) in the priority order.

types of triggering criteria. The external conditions which influence the trigger decision. They include, for example, none/cause code/number of received digits/specific digit string/timer expiration.

Logical operator between the triggering criteria: AND/OR.

Triggering criteria.

Failure activities: Continue call without SCP enquiry or release call with an announcement.

In the preferred embodiment of the invention, the intelligent network comprises predefined service packages consisting of one or more services. Consequently, the block SSF of the mobile services switching center VMSC also maintains the service package records each of which comprises pointers to the trigger records with services corresponding to those included in the service package.

Figure 3:
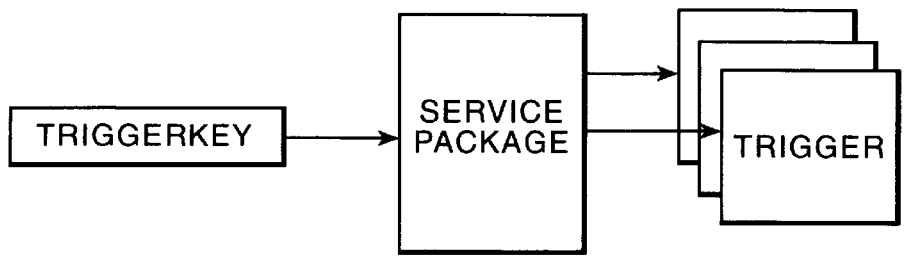
FIG. 3 shows a diagram illustrating the interrelation between a trigger key, service packages and triggers.

In order for the mobile services switching center MSC to be able to recognize a call requiring intelligent network service and to activate the correct triggers for the service, a new parameter, a subscriber based trigger key, is created in the subscriber data of the mobile subscriber. This trigger key indicates which IN services have been provisioned for the mobile subscriber. Each subscriber may only have one trigger key value of numerical type. Each trigger key value points to one or more triggers for a service, either directly or with reference to the service package comprising the triggers for the desired services. FIG. 3 illustrates the latter situation. First, the trigger/triggers are created, and then the service package/packages. After that, the trigger key pointing to the service package can be created. The trigger key can be provided with a value indicating that the trigger key is not used by said mobile subscriber.

In the GSM system, the trigger key is created in the mobile subscriber data in the database of the home location register HLR. Its value in the database can be examined and changed by commands of the man-machine language. The trigger key and other subscriber data are transferred by means of the MAP protocol from the home location register HLR to the visitor location register VLR in connection with, for example, location updating. Therefore, in the transfer of the trigger key, a method employed by the supplementary services of the GSM system is used by allocating a supplementary service code for the IN service. The VLR stores, along with other subscriber data, the trigger key value it has obtained from the HLR for possible future use.

The trigger key is used for activation of an intelligent network service in both the mobile originating call (MOC) and the mobile terminating call (MTC). In the MTC call, the triggering of an intelligent network service may take place either in the gateway MSC (GMSC) or in the VMSC.

Figure 4:
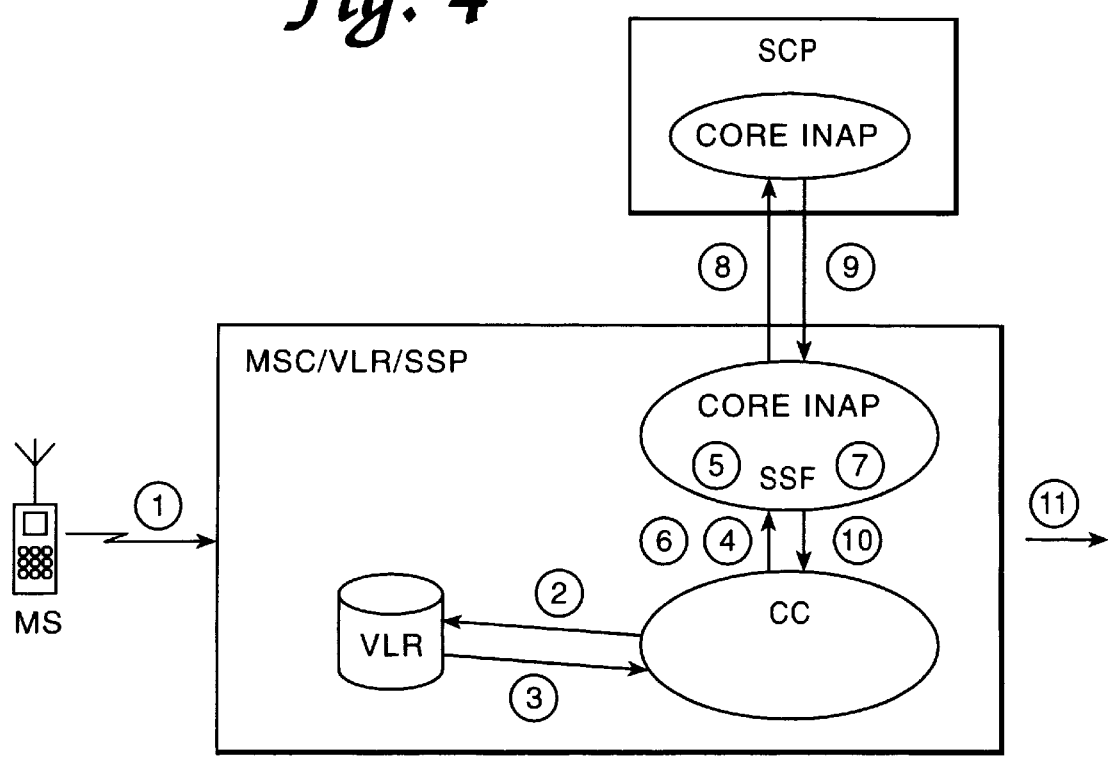
FIGS. 4, 5 and 6 show event diagrams illustrating the use of the trigger key according to the invention in a mobile originating call in a VMSC, and in a mobile terminating call in a VMSC or GMSC.
Figure 5:
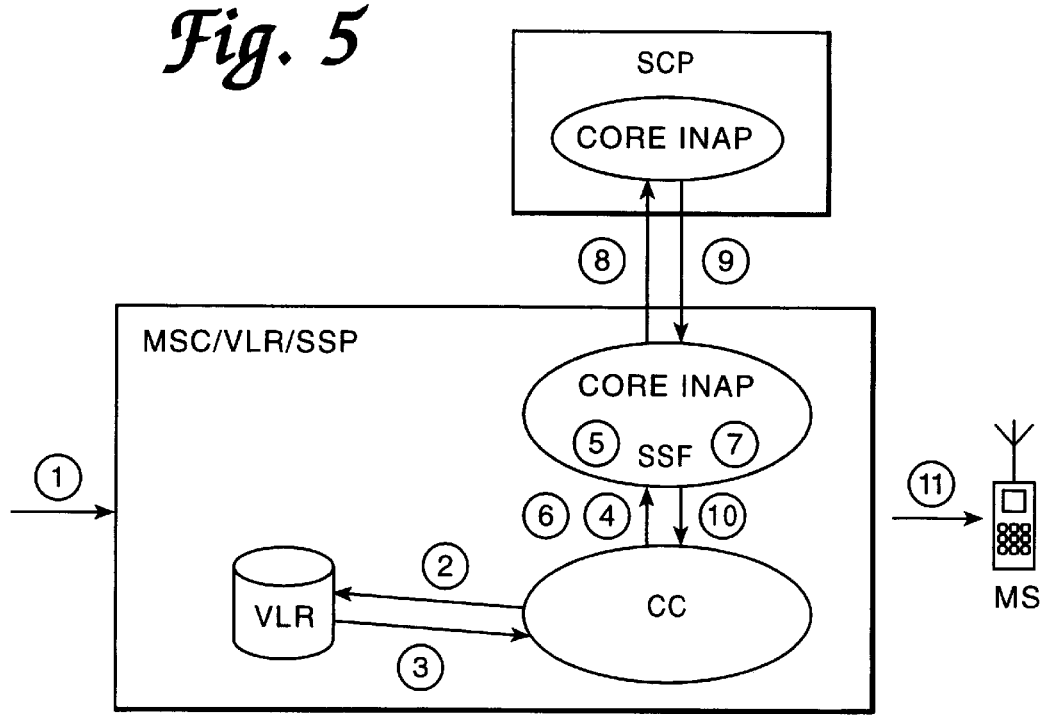
Figure 6:
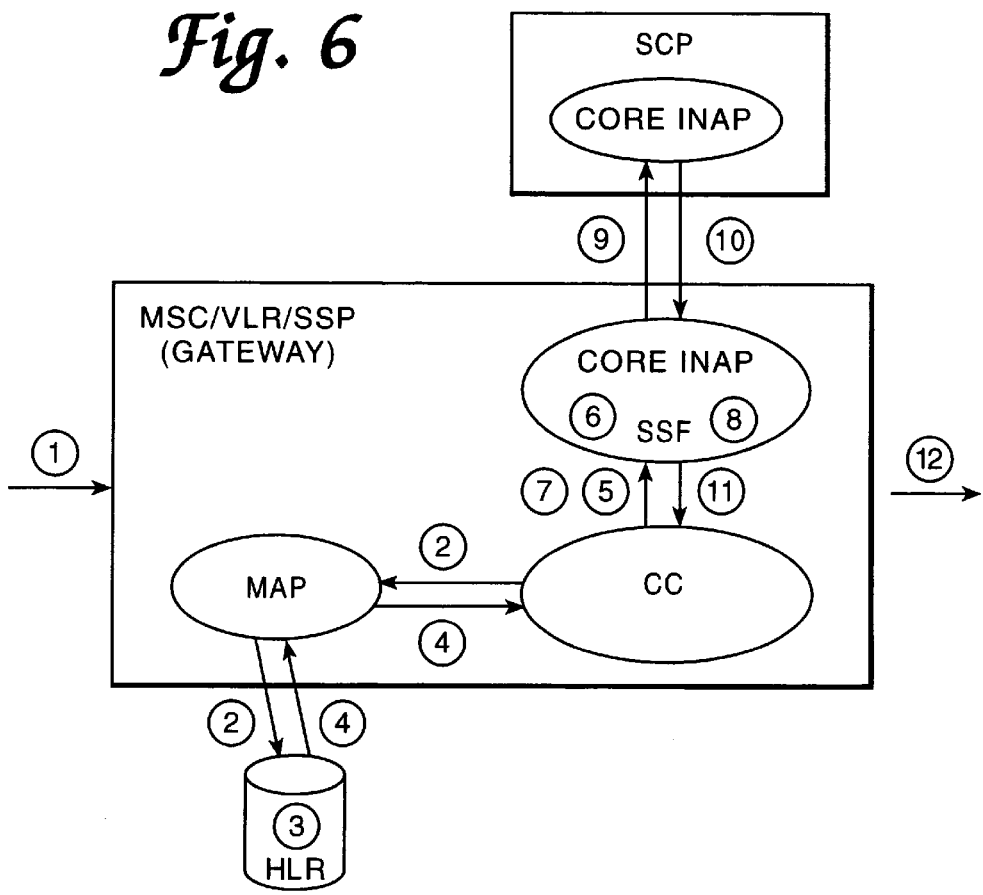

The following will illustrate the three situations by means of FIGS. 4, 5 and 6.

FIG. 4 describes the use of the trigger key according to the invention in a mobile MS originating call. At first, it is assumed that the visitor location register VLR of the mobile services switching center VMSC has stored the trigger key value it has obtained from the home location register HLR of the mobile subscriber in the subscriber data of the mobile subscriber currently located within the VLR area as the mobile station for the first time updates its location to the VLR. As the subscriber places a call from the mobile station MS (step 1), the call control CC of the mobile services switching center VMSC/SSP requests subscriber data of the mobile subscriber from the VLR (step 2). The VLR responds with a message, for example COMPLETE_CALL, which also transfers the trigger key to the call control (step 3). The call control CC locates the trigger key, and informs the service switching function SSF of the trigger key (step 4). The SSF activates those IN service triggers in its memory that point to the service package corresponding to the service key value given (step 5). Alternatively, the SSF may have the triggers in its memory as a trigger table in which the trigger key value points directly to one trigger or a group of several triggers. Following this, the call control CC continues call setup until the call control reaches a phase which is a detection point DP of the ETSI CS_1 basic call state model BCSM, the detection point being an event relating to the call processing. The CC informs the SSF of the encountered detection point DP (step 6). The SSF checks whether any active triggers have been set for this detection point DP. If there are no active triggers for this detection point DP, no IN service need be triggered, and the CC continues call setup forward. If an active trigger is found for this detection point DP, the SSF checks the trigger criteria comprised in the trigger (step 7). If the trigger criteria comprised in the trigger are fulfilled, the SSF activates the IN service corresponding to the trigger in the service control point SCP whose address the trigger gives (step 8), the IN service being determined by the service key in the trigger. The SCP responds the way the service requires (step 9). Furthermore, the service may require additional communication between the SCP and the SSF. Alternatively, the SCP may send instructions in step 9 concerning call setup to the mobile services switching center VMSC/SSP. The SSF forwards the instructions to the call control CC (step 9) which carries out the required call control function, for example call forwarding (step 11). Steps 9–11 may be carried out by the normal principles of the intelligent network model, and it is not necessary to describe them here in any closer detail.

FIG. 5 illustrates the use of the trigger key according to the invention in a mobile terminating call (MTC). At first, it is again assumed that the VLR has stored the trigger key value of a mobile subscriber within its area, which value it has obtained from the HLR at some earlier phase. The mobile services switching center VMSC/SSP receives the MTC call (step 1). The call control CC requests of the subscriber data of the called mobile subscriber (step 2) from the VLR, and receives in the response message the trigger key value of the mobile subscriber (step 3). Following this, the mobile services switching center uses the trigger key as in FIG. 4. In other words, the CC informs the SSF of the trigger key value (step 4), and the SSF activates the corresponding triggers (step 5). Following this, the CC notifies the SSF every time it encounters a call phase which is a detection point DP of the BCSM model (step 6) and, consequently, the SSF performs the necessary checks in the triggers (step 7) and, if necessary, activates an IN service in a SCP (step 8). Sending of a response message from the SCP to the SSF (step 9), and the consequent call control measures in the mobile services switching center VMSC (steps 10 and 11), may be included in the activated IN service.

FIG. 6 illustrates the use of the trigger key according to the invention in a mobile MS terminating call (MTC) in a gateway mobile services switching center GMSC. It is assumed that the trigger key value has been determined in the subscriber data of the mobile subscriber in the home location register HLR database. The gateway mobile services switching center GMSC, whose structure according to the invention is similar to the VMSC/SSP except for its gateway function, receives the MTC call (step 1). The GMSC call control CC carries out a routing information enquiry to the home location register HLR of the mobile subscriber by employing the MAP protocol (step 2). The enquiry message may comprise information on the GMSC ability to function as the intelligent network service switching point SSP. The HLR retrieves the subscriber data of the mobile subscriber and checks whether a trigger key value has been defined for the mobile terminating call MTC (step 3). If such a trigger key value does not exist, the HLR proceeds according to the normal procedure of the mobile communication network, which results in the HLR sending a normal routing information to the requesting GMSC. If the HLR detects that the mobile subscriber has a trigger key value defined for the mobile terminating call MTC, the HLR deviates from the normal procedure and checks whether the requesting GMSC is also a service switching point SSP of the intelligent network. This piece of information is provided by the routing information requesting message. If the GMSC is not a SSP, the HLR will proceed according to the normal procedure.

If the GMSC is also a SSP, the HLR returns the trigger key value to the GMSC/SSP center (step 4). The call control CC informs the trigger key value to the SSF (step 5) which activates the triggers corresponding to the trigger key (step 6). The CC continues call control until it meets a detection point DP of the BCSM call model, and the call control CC informs the SSF of the detection point DP (step 7). The SSF performs the checks concerning the triggers as it did in connection with FIGS. 4 and 5 (step 8), and, if necessary, activates the intelligent network service in a SCP (step 9). The activated service may require both a response from the SCP (step 10) and call control procedures in the mobile services switching center GMSC (steps 11 and 12).

The activated service may be such as to allow the continuing of routing in the normal manner. In such a case, the GSMC must request new routing information from the HLR. The normal operation of the HLR can be ascertained in such a situation, for example, by omitting from the new enquiry the information that the GMSC is also a SSP.

In the above, reference has been made to the CS-1 BCSM call model. The reason for the need to model a call lies in the fact that in order to be able control the IN service, the SCP must know the phase of the call in real time. By modelling, both the SSP and the SCP implicitly know the call phases and possible interaction points where the SCP may have an effect on the call, i.e. the detection points DP. As the call attempt proceeds to the detection point DP, the MSC/SSP will carry out an SCP enquiry in the following cases:

the DP is a Trigger Detection Point (TDP), and the trigger criteria is fulfilled.

or the DP is an Event Detection Point (EDP) in which the SCP is interested. The SCP orders the EDPs to be reported on call by call basis.

There are two types of EDPs: "Request" and "Notification". When the SSP makes a SCP enquiry in a detection point DP of the type "Request", the call handling must be suspended, and it is necessary to wait for a response from the SCP.

In the case of a mobile originating call MOC, the following TDPs of the ETSI CS-1 OBCSM call model (Originating Basic Call State Model) can be utilized:

TDP2: Collected_Info.

In this TDP, the MSC/SSP has received the call setup message either from the MS, PBX or trunk line. In MOC case the Identification, Authorization and the check of basic service has been accomplished before entering this DP. The main triggering criteria in TDP2 is based on the IN category of the calling party, which is included in the subscriber data.

TDP3: Analyzed_Info.

In this TDP, the MSC has performed the digit analysis, but the call has not been routed yet. Charging analysis has been performed. The main triggering criteria involves the analyzed B-number.

In mobile terminating call MTC case, the TDP of the ETSI CS-1 TBSCM (Terminating Basic Call State Model) call model usable according to the present invention is:

TDP12: Term_Attempt_Authorized.

In this TDP, the MSC has identified, authenticated and paged the MS. The main triggering criteria is the IN category of the mobile terminating service.

The figures and their description are only intended to illustrate the present invention. The system and method set forth can be changed and amended without departing from the scope and spirit of the attached claims. For example, the mobile services switching center may also receive the trigger key of the mobile subscriber on the basis of digit analysis of the called subscriber, in an incoming signalling file or in supplementary service information of the exchange.

We claim:

1. A mobile communication system comprising
at least one mobile services switching center,
mobile subscribers,
at least one subscriber database
an intelligent network comprising at least one service switching point and at least one service control point comprising the database and service logic programs of the intelligent network, whereby the intelligent network contains predefined service triggers, each service trigger defining triggering criteria for activating a respective intelligent network service in one of the service control points,
the mobile services switching center operating as the service switching point of the intelligent network, and the service control point being implemented as a functional unit independent of the mobile services switching center, and communicates with the mobile services switching center by means of an intelligent network interface and an intelligent network protocol,
subscriber data of a mobile subscriber entitled to intelligent network services in said at least one subscriber database including a service trigger key pointing to one or more service triggers,
the mobile services switching center being arranged to react to the service trigger key of the mobile subscriber during call setup by retrieving one or more service triggers pointed to by the trigger key, and by triggering an intelligent network service corresponding to said retrieved service trigger in one of the service control points as the triggering criteria of the service trigger are met.

2. A mobile communication system as claimed in claim 1, wherein the mobile services switching center comprises the service triggers and trigger keys of the intelligent network in the form of a table in which each trigger key points to one or more triggers.

3. A mobile communication system as claimed in claim 1, comprising predefined service packages for one or more services in the intelligent network, each package having a dedicated trigger key.

4. A mobile communication network as claimed in claim 1, wherein the mobile services switching center comprises
a call control point for intelligent network calls,
a service switching function having the ability to communicate with the service control point by using a standard intelligent network protocol, and with the call control point by using an internal interface.

5. A method for activating an intelligent network service in a mobile communication network comprising at least one mobile services switching center, mobile subscribers, at least one subscriber database and an intelligent network comprising at least one service switching point, and at least one service control point comprising a database and service logic programs of the intelligent network, the method comprising:

maintaining in the intelligent network predefined service triggers, each service trigger defining triggering criteria for activating a respective intelligent network service in one of the service control points, defining in a subscriber data of a mobile subscriber entitled to intelligent network services with a trigger key which points to one or more service triggers, maintaining the service triggers in the mobile services switching center so that they can be activated by the trigger key, activating in the mobile services switching center, in conjunction with an intelligent network call, the service triggers pointed to by the trigger key of the mobile subscriber, and triggering the intelligent network service corresponding to the service trigger in one of the service control points as the triggering criteria of the service trigger are met in the mobile services switching center.

6. A method as claimed in claim 5, comprising obtaining, at the mobile services switching center, the trigger key of the mobile subscriber as a result of analysis of a directory number of a called subscriber, in an incoming signaling file or in supplementary service information of a private branch exchange.

7. A method as claimed in claim 5, comprising:

storing the trigger key of the mobile subscriber entitled to intelligent network services in subscriber data of said at least one subscriber database, transferring the trigger key from said at least one subscriber database to the mobile services switching center during call setup, activating in the mobile services switching center the one or more of service triggers to which the trigger key point, and triggering the intelligent network service corresponding to the service trigger in one of the specific service control points as the triggering criteria are met in the mobile services switching center.

8. A method as claimed in claim 7, further comprising:

initiating the call setup by the mobile subscriber, carrying out by the mobile services switching center an inquiry to the subscriber database, sending the trigger key from the subscriber database to the mobile services switching center in a response, activating by the mobile services switching center the service triggers pointed to by the trigger key, and triggering by the mobile services switching center the intelligent network service corresponding to the service trigger in one of the specific service control points, when the triggering criteria are met in the mobile services switching center.

9. A method as claimed in claim 7, further comprising:

receiving, at the mobile services switching center, the mobile terminating call, carrying out by the mobile services switching center an inquiry to the subscriber database, sending the trigger key from the subscriber database to the mobile services switching center in a response, activating by the mobile services switching center the service triggers pointed to by the trigger key, and triggering by the mobile services switching center the intelligent network service corresponding to the service trigger in one of the service control points as the triggering criteria are met in the mobile services switching center.

10. A method as claimed in claim 5, wherein the activation of an intelligent network service in a mobile terminating call comprises in a gateway mobile services switching center of the mobile communication network, the method further comprising:

receiving, at the gateway mobile services switching center, the mobile terminating call, carrying out by the gateway mobile services switching center a routing information inquiry to the subscriber database, detecting by the subscriber database the trigger key in subscriber data of the mobile subscriber, sending the trigger key, instead of a routing information, from the subscriber database to the gateway mobile services switching center, activating by the gateway mobile services switching center the service triggers pointed to by the trigger key, and triggering by the gateway mobile services switching center the intelligent network service corresponding to the service trigger in a specific service control point, when the triggering criteria are met in the gateway mobile services switching center.

11. A method as claimed in claim 10, further comprising:

transferring, in the routing information inquiry, information on whether the gateway mobile services switching center is able to function as the service switching point of the intelligent network, sending the trigger key from the subscriber database to the gateway mobile services switching center, if it is able to function as the service switching point of the intelligent network, and sending the routing information from the subscriber database to the gateway mobile services switching center, if it is not able to function as the service switching point of the intelligent network.

12. A method as claimed in claim 5, wherein the service trigger includes a control point address of the service, a service key, a service trigger priority, a call model detection point in which the service can be activated, and a triggering criteria.

13. A method as claimed in claim 12, further comprising:

detecting by the mobile services switching center the detection point of the call model, checking by the mobile services switching center whether there are active service triggers set for the call model detection point, checking by the mobile services switching center whether the active service trigger is in use and whether the triggering criteria are met, and activating by the mobile services switching center the intelligent network service by sending an activation message to the service control point, if the triggering criteria are met.

14. A method as claimed in claim 5, further comprising:

storing the service triggers in the mobile services switching center in form of a trigger table indexed by the trigger keys, and activating the triggers by retrieving those service triggers in the service trigger table pointed to by the trigger key.

15. A method as claimed in claim 5, further comprising predefined service packages, each package consisting of one or more intelligent network services, and having a dedicated trigger key.

16. A method as claimed in claim 5 in a mobile communication network whose subscriber databases comprise at least one home location register and at least one visitor location register, the method further comprising transferring the trigger key from the home location register to the visitor location register during location updating.

* * * * *